United States Patent

Axelsson

Patent Number: 5,213,187
Date of Patent: May 25, 1993

[54] DEVICE RELATING TO A SEMI-AUTOMATIC CLUTCH FOR VEHICLES

[76] Inventor: John L. Axelsson, Sågarevägen 6,, S-669 00, Deje, Sweden

[21] Appl. No.: 885,650

[22] Filed: May 19, 1992

[51] Int. Cl.$^5$ ............................................. F16D 25/00
[52] U.S. Cl. ................................... 192/85 R; 192/52; 192/83; 192/109 F
[58] Field of Search ............ 192/85 R, 114 R, 109 D, 192/52, 109 F, 83

[56] References Cited

U.S. PATENT DOCUMENTS

| 2,277,454 | 3/1942 | Porsche | 192/91 R |
| 3,866,727 | 2/1975 | Myers | 192/109 D X |
| 3,963,107 | 6/1976 | Bolger | 192/109 D |
| 4,561,460 | 12/1985 | Smith | 137/493.2 |
| 5,056,632 | 10/1991 | Lemp et al. | 192/114 R X |

FOREIGN PATENT DOCUMENTS

| 158004 | 1/1985 | European Pat. Off. . |
| 695921 | 9/1940 | Fed. Rep. of Germany . |
| 904264 | 2/1954 | Fed. Rep. of Germany . |
| 2856150 | 7/1979 | Fed. Rep. of Germany . |
| 753516 | 7/1956 | United Kingdom . |
| WO89/01880 | 3/1989 | World Int. Prop. O. . |

OTHER PUBLICATIONS

Japanese Patent Abstract, No. 53-93526, Appln. No. 52-6495, entitled "Apparatus for Controlling Clutch of Automobiles", Aug. 1978.

Primary Examiner—Rodney H. Bonck
Assistant Examiner—Andrea Pitts
Attorney, Agent, or Firm—Griffin Butler Whisenhunt & Kurtossy

[57] ABSTRACT

The invention relates to a device related to motor driven vehicles such as tractors for semi-automatic engagement and disengagement of the drive. According to the invention an actuating cylinder (12) is arranged to act on the clutch of the vehicle, which actuating cylinder (12) is hydraulically connected to a control device (1) with a control device (2), which from a first position is arranged to be transferred to a second position in connection with the disengagement of the drive of the vehicle and to be rapidly transferred back to the first position corresponding to the beginning of engagement, whereafter the return flow as the actuating cylinder is arranged to control the return movement of the actuating cylinder (12) at a lower rate from the position of beginning engagement to complete engagement of the drive.

10 Claims, 1 Drawing Sheet

DEVICE RELATING TO A SEMI-AUTOMATIC CLUTCH FOR VEHICLES

TECHNICAL FIELD

This invention concerns a device relating to motorized vehicles such as tractors and intended for semi-automatic engagement and disengagement of the drive of the vehicle.

BACKGROUND OF THE INVENTION

It is a well-know fact that drivers of tractors and similar rather heavy vehicles often suffer of injuries due to overloading caused by clutch pedals which are heavy to manoeuvre, although there exist servo devices on the market which can be connected to the clutch pedal and which should facilitate the manoeuvring of the clutch pedal when engaging and disengaging the drive. The devices in question are intended to be manoeuvred by the foot of the driver which implies that a supplementary clutch pedal must be placed in the driver's cabin in such a way that the driver can reach the pedal in question with his foot without any difficulty. However, it is often difficult to install such a device in such a way that the pedal is correctly placed from an ergonomical point of view, taken into consideration that the available space in the driver's cabin often is rather limited in the region of the driver's feet.

Drivers who suffer from overload-related injuries may in connection with the manoeuvring of a servo-assisted clutch pedal be exposed to difficulties and risks especially in those cases when the pedal of the servo device due to lack of space has been placed in an ergonomically unfavourable position.

BRIEF DESCRIPTION OF THE INVENTION

It is the aim of the invention to provide an improved device of the kind indicated in the introduction. The improvement which in this connection primarily is aimed at, is to eliminate the disadvantages of the devices of prior art. More specifically it is an aim to provide a device which can be hand-actuated. The aim is achieved by means of a device including an actuating cylinder, which is arranged to act on the clutch of the vehicle, which actuating cylinder is hydraulically connected to a control device with a control means which from a first position is arranged to be transferred to a second position in connection with the disengagement of the drive of the vehicle and which in connection with the engagement of the drive of the vehicle is quickly transferred back to the first position corresponding to the position of beginning engagement of the clutch, whereafter the return flow of the actuating cylinder is arranged to control the return movement of the actuating cylinder with a lower speed from the position of beginning engagement to full engagement of the drive.

The device according to the present invention includes a hydraulic memory unit (the control device 1—which memorizies the direction of flow) with two distinct positions, which positions are determined by the direction of movement of the actuating cylinder (engagement or disengagement) or the direction of flow. In one of the positions the flow to the actuating cylinder is fed directly from the source of pressure to the actuating cylinder. In the other position the flow is fed through a strangulation to the recipient of hydraulic liquid. The memory unit has only one movable part namely the piston (control means 2). One of the positions of this piston can be fixed and determined very distinctly in a very simple way by means of a stop screw.

This flow direction controlled memory unit makes it possible to manage a clutch pedal with a strong return spring smoothly and without any effort surprisingly easy. The device according to the present invention includes a simple and strong control means, an actuating valve and a control valve. These components can be assembled to form an integrated unit, but they can also be placed in different spare places of an existing vehicle with only a small available space for supplementary equipment. The components which are included in the device have reduced external dimensions. Thus a high flexibility is obtained in connection with the installation in existing vehicles. The device according to the present invention can be completely hydraulic, in which case it does not require any supply of electricity or compressed air. The device can thus be installed in practically all motor driven vehicles with a conventional clutch. The device provides the same smooth engagement of the clutch (with a rapid movement to the beginning of engagement and a smooth slow movement from the beginning of engagement to complete engagement) as obtained by more complicated devices according to prior art.

Further characteristics and aspects of the invention will become apparent from the following description and from the appending claims.

SHORT DESCRIPTION OF DRAWINGS

In the following description reference will be made to the following drawings, in which FIG. 1 schematically shows a longitudinal section through the control valve and in form of a circuit diagram the remaining components belonging to the device, FIG. 2 shows a completely hydraulical version of the control valve in symbolic representation, and FIG. 3 shows an electro-hydraulical valve in symbolic representation in the non-actuated position of the valve.

DESCRIPTION OF A PREFERRED EMBODIMENT

Figure 1:
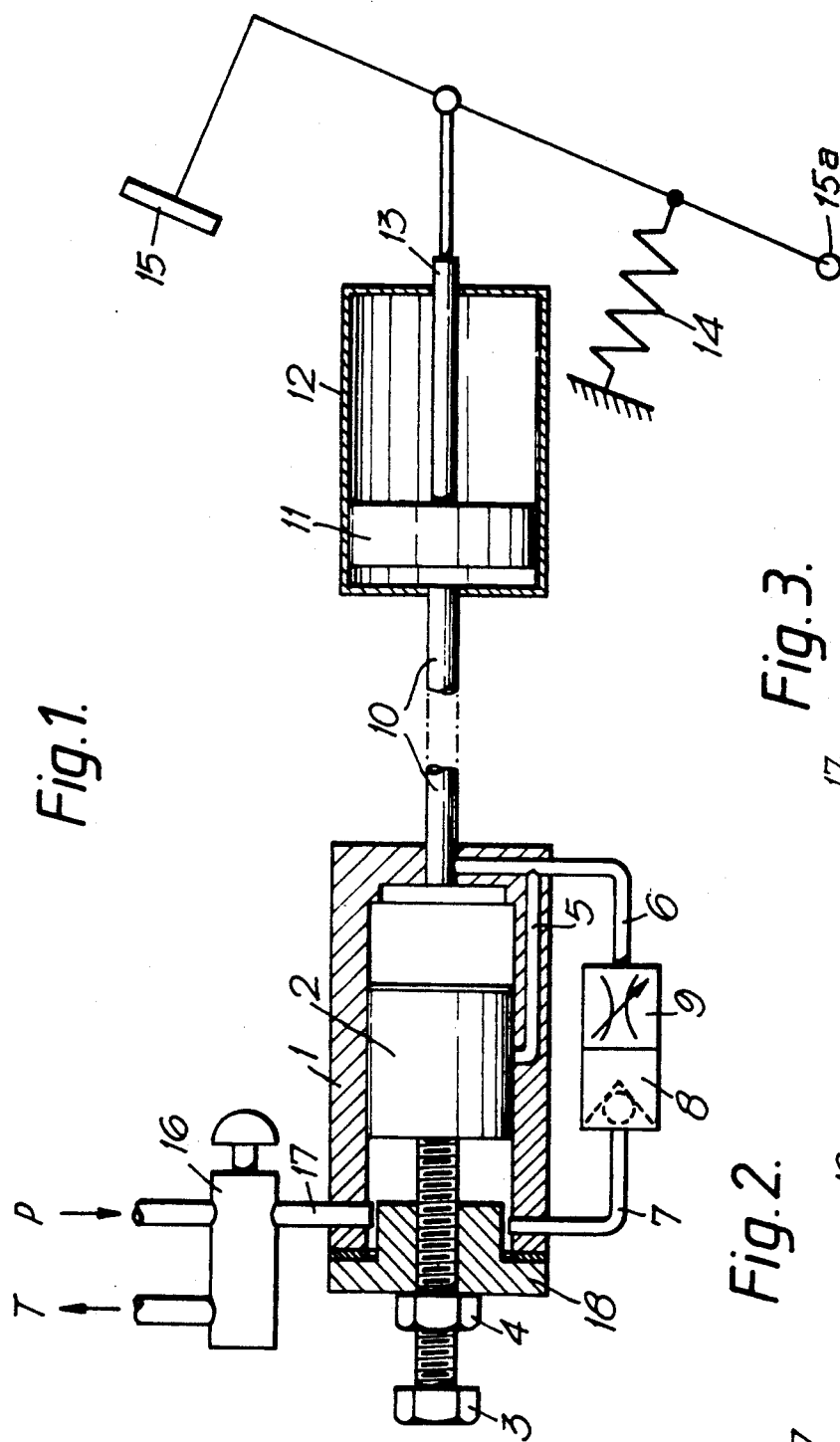

With reference to the drawings a control valve is generally designated with the reference number 1. The control valve 1 is by means of an hydraulical conduit connected to a actuating cylinder 12 having a piston 11 and a telescopically arranged piston rod 13, which is connected to the clutch pedal 15 of the vehicle by means of an articulated joint. The clutch pedal 15 is maintained in its uppermost position by means of a spring 14.

Figure 3:
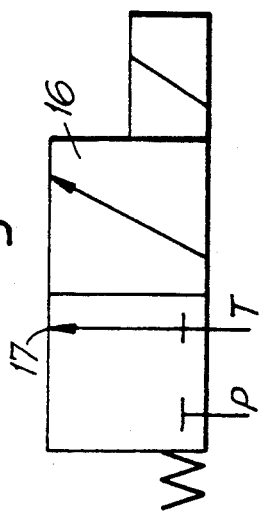
Figure 2:
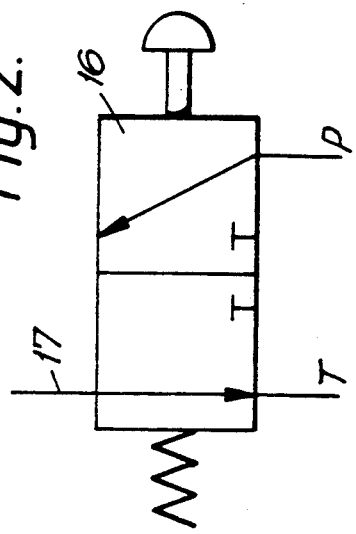

The control valve 1 is also connected to a two-way valve 16 with two positions and three connections by means of a hydraulical conduit 17. The manoeuvring valve 16 can be either hydraulical or electrohydraulical. In FIG. 1 and FIG. 2 the hydraulical version is shown which is intended for hand manoeuvring and is provided with a pull back spring. The electrohydraulical version is shown in FIG. 3. The electrohydraulical version is manoeuvred by means of an electrical actuator which also is provided with a pull back spring. It is not possible to leave the device leaving the clutch pedal in its pressed down position (dead man's grip). The hydraulical conduit 17 is connected to one of the three connections of the valve 16. One of the remaining connections is connected to a pressure source P and the other one is connected to an oil tank T.

The control valve 1 is by means of an hydraulical conduit 6 connected to a strangulation valve 9. The strangulation valve 9 is adjustable. It thus permits the strangulation to be adjusted. Between the strangulation valve 9 and the hydraulical conduit 7 a non-return valve 8 is installed, preventing the oil from flowing in the direction from the conduit 7 to the strangulation valve 9. FIG. 1 also shows that the non-return valve 8 only permits a flow of oil in the direction from the conduit 6 to the hydraulical conduit 7. The non-return valve 8 prevents a flow in the opposite direction.

The control valve 1 also includes a control piston 2. The movement of the control piston 2 is limited in the direction to the left according to FIG. 1 by means of an adjustable stop screw 3, which is screwed into a removable end member 18 of the control valve 1. The stop screw can be locked in different positions by means of the locking nut 4. The extreme position of the control piston 2 closest to the end member 18 can be adjusted by means of the stop screw 3 which can be placed in different positions. In the cylinder casing of the control valve 1 there is also a follow up conduit 5, with one end leading to the inner cylindrical part of the control valve 1 and with the other end ending in the hydraulical conduit 10 between the control valve 1 and the actuating cylinder 12. The hydraulical conduit 6 which has one end connected to the strangulation valve 9 has an other end connected to the follow up conduit 5.

When the spring loaded push button belonging to the valve 16 is not pressed down, the connection to the conduit 17 of the valve 16 is connected to the connection leading to the oil tank. When the push button belonging to the valve 16 is pressed down, the conduit 17 is connected to a source of oil pressure P which implies that pressure is built up on that side of the control piston 2 which is closest to the end member 18. The piston 2 is thus transferred in such a direction that the distance to the end member 18 is increased. This movement of the piston 2 is stopped when the piston reaches the opposite end member of the cylinder of the control valve 1.

When the piston 1 has reached its end position at its maximal distance from the end member 18 and from the stop screw 3 the connection between the follow up conduit 5 and the interior of the control valve 1 is opened. Oil can now pass through the follow up channel 5 to the hydraulical connection 10 and from there to the actuating cylinder 12. The oil pressure will act on the piston 11 in a direction that causes the clutch pedal 15 to be pressed down by the piston rod 13 and causes the spring 14 to be stretched. The source of oil pressure P, the hydraulical conduits 17, 10, and the follow up channel 5 have such dimensions that the clutch pedal is quickly pressed down in its bottom position. If the device is mounted on a tractor a rapid disengagement of the drive clutch 15a is thus obtained.

As long as the push button belonging to the valve 16 is kept in its pressed down position, the clutch pedal will stay in its pressed down position. When the push button belonging to the valve 16 is no longer pressed down, the communication between the hydraulic conduit 17 and the source of pressure is interrupted and at the same time a connection is established between the conduit 17 and the oil tank. The pressure on the side of the control piston 2 which is closest to the end member 18 will thus be reduced to a level which is much lower than the pressure on the opposite side of the control piston 2. The control piston 2 will thus move in the direction towards the end member 18, and the piston 11 which is connected to the clutch pedal 15 by means of piston rod 13 will follow the movement of the piston 2 of the control valve 1. The clutch will thus be lifted rapidly until the control piston 2 reaches the stop screw 3. Hydraulic oil will then be led through the conduit 6 and through the strangulation valve 9, which means that the movement of the actuating piston 11 will be considerably retarded. The hydraulical oil cannot pass through the follow up conduit 5 due to the fact that its connection to the control valve is blocked by means of the control piston 2. From the strangulation valve 9 the hydraulical oil is led to the tank through a conduit 7 and through that part of the control valve 1 which is located between the piston 2 and the end member 18 and further through the conduit 17 and the valve 16.

The function of the non-return valve 8 is to prevent a communication between both sides of the control piston 2 when the clutch pedal is pressed down. If such communication would be established the control piston 2 would not be pushed to its bottom position. Without the non-return valve 8 the bottom position of the control piston 2 would be fluctuating and not stable.

When the control piston 2 in connection with its movement in the direction towards the end member 18, and in connection with the engagement of the driving, reaches the stop screw 3, the lifting speed of the clutch pedal 15 is reduced to a value determined by the strangulation of the strangulation valve 9.

The strangulation of the strangulation valve 9 is variably adjustable. Thus the rate of lift of the clutch pedal 15 following the instant in which the control piston has reached the stop screw 3 can be adjusted to a desired value.

The transition from rapid lifting movement of the clutch pedal 15 to slow movement can be adjusted by means of the stop screw 3 which can be adjusted in different positions. The stop screw 3 in conveniently adjusted in such a way that the reduction of lifting speed of the clutch pedal is postponed until the instant in which the plates of the clutch which transmit the torque from the driving reach each other.

The stop screw will thus be adjusted in such a way that the control piston 2 will get in touch with the stop screw when the position of the clutch pedal corresponds to the beginning of the engagement of the drive.

The stop screw 3 thus permits a continuously variable adjustment of the transition from rapid lifting of the clutch pedal 15 to slow lifting of the clutch pedal. The adjustment of the stop screw 3 furthermore permits the reduction of the speed of the lifting movement of the clutch pedal 15 to be adjusted in accordance with the wear of the lining of the plates of the clutch. By means of an adjustment of the strangulation valve 9 it will furthermore be possible to variably adjust the speed at which the plates of the clutch are brought together after the instant when the linings first touch each other in connection with the engagement of the drive.

The slow lifting movement of the pedal continues until the clutch pedal reaches its uppermost position.

The adjustment of the strangulation valve 9 can for instance be carried out by means of a knob, which can be placed on the control panel of the tractor. The speed with which the plates of the clutch are brought together in connection with the engagement of the drive can thus be adjusted to the requirements in different situations.

The valve 16 can be adapted to foot operating or hand operating and it can be placed for instance on the floor of the driver's cabin or close to the stearing wheel or close to the gear lever.

The piston rod 13 is arranged telescopically in order also to permit the clutch pedal to be operated by the foot without using the device according to the invention.

Taking into consideration that available space is scarce when mounting the device for instance on a tractor, the device according to the described preferred embodiment has a separate control valve and an actuating cylinder. It is however possible to design the control valve and the actuating cylinder in such a way that they together build a unit in form of a component including the control valve and the actuating cylinder.

Also other modifications of the described embodiment than those mentioned above are possible without departing from the general principles of the invention and without exceeding the scope of the following claims.

I claim:

1. In an apparatus for semi-automatic engagement and disengagement of a drive clutch in a motor driven vehicle, having an actuating hydraulic cylinder with an actuating piston movable in the cylinder and operably connected to the clutch and a clutch pedal by a piston rod for engagement and disengagement of the clutch, a hydraulic pressure source, and a conduit hydraulically connecting the pressure source and the actuating cylinder for moving the actuating piston and correspondingly the clutch, the improvement comprising:

a hydraulic fluid flow control device disposed in the conduit, said control device having a control means which is movable from a fully engaged position corresponding to a fully engaged clutch position to a first position corresponding to a beginning to engage clutch position and to a second position corresponding to a fully disengaged clutch position such that movement of the actuating piston and clutch is controlled by the movement of the control means and the speed of the control means in moving from the second position to the first position is greater than the speed of the control means in moving from the first position to the fully engaged position.

2. Apparatus according to claim 1 characterised in that the first position of the control means is continuously variably adjustable.

3. Apparatus according to claim 2, characterised in that a strangulation valve which is variably adjustable in different strangulation positions controls the speed of movement of the actuating piston of the actuating cylinder when the control means is in the first position.

4. Apparatus according to claim 3, characterised in that a follow up conduit connects the control device with the actuating cylinder when the control means is in the second position.

5. Apparatus according to claim 4, characterised in that a two way valve is arranged between the control device and the hydraulic pressure source.

6. Apparatus according to claim 1, characterised in that the piston rod is telescopic.

7. Apparatus according to claim 3, characterised in that the strangulation valve is continuously variably adjustable.

8. Apparatus according to claim 1, characterised in that a two way valve is disposed between the pressure source and the control device, and the valve is regulated by a push button.

9. Apparatus according to claim 1, characterised in that the first position of the control means is adjustable by means of a stop screw with a locking nut.

10. Apparatus according to claim 1, characterised in that the control device and the actuating cylinder are assembled to form a unit.

* * * * *